(12) United States Patent
Smith et al.

(10) Patent No.: US 10,825,446 B2
(45) Date of Patent: Nov. 3, 2020

(54) TRAINING ARTIFICIAL INTELLIGENCE TO RESPOND TO USER UTTERANCES

(71) Applicant: International Business Machines Corporation, Armonk, NY (US)

(72) Inventors: Aaron T. Smith, Raleigh, NC (US); Andrew R. Freed, Cary, NC (US); Joshua S. Allen, Durham, NC (US); Jason M. Brown, Cary, NC (US); Ryan Brink, Raleigh, NC (US); Sorabh Murgai, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 16/190,253

(22) Filed: Nov. 14, 2018

(65) Prior Publication Data

US 2020/0152173 A1 May 14, 2020

(51) Int. Cl.
*G10L 15/06* (2013.01)
*G06N 3/08* (2006.01)
(Continued)

(52) U.S. Cl.
CPC .............. *G10L 15/063* (2013.01); *G06N 3/08* (2013.01); *G10L 15/16* (2013.01); *G10L 15/18* (2013.01); *G10L 15/22* (2013.01); *G10L 15/30* (2013.01)

(58) Field of Classification Search
CPC ......... G10L 15/30; G10L 15/22; G10L 15/10; G10L 15/1815; G10L 2015/225; G10L 2025/783; G10L 25/51; G10L 25/54; G10L 13/00; G10L 13/02; G10L 15/00; G10L 15/02; G10L 15/08; G10L 15/1822; G10L 2015/223; G10L 13/043; G10L 15/005;
(Continued)

(56) References Cited

U.S. PATENT DOCUMENTS 9,311,913 B2  4/2016 Legat
9,436,738 B2  9/2016 Ehsani et al.
(Continued)

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Huyen X Vo
(74) *Attorney, Agent, or Firm* — Law Office of Jim Boice

(57) ABSTRACT

A method improves a functionality of a conversational agent that is generated by an artificial intelligence (AI) system. A conversational agent receives a first utterance from a first entity. The AI system identifies an unverified response to the first utterance; sends the unverified response to the first entity; and receives a positive feedback indication about the unverified response from the first entity. The AI system searches a data store in order to identify an entry for a second utterance by a second entity, where the second entity has sent a positive feedback for the unverified response. The AI system sends the second utterance and the unverified response to the first entity, and receives a positive feedback for the unverified response to the second utterance from the first entity in order to mark the unverified response as a verified response, which responds to future receipts of the first utterance.

20 Claims, 7 Drawing Sheets

(51) Int. Cl.
*G10L 15/18* (2013.01)
*G10L 15/22* (2006.01)
*G10L 15/30* (2013.01)
*G10L 15/16* (2006.01)

(58) Field of Classification Search
CPC ........... G10L 15/063; G10L 2015/0631; G10L 2015/088; G10L 13/08; G10L 15/01
See application file for complete search history.

(56) References Cited

U.S. PATENT DOCUMENTS

| | | |
|---|---|---|
| 9,552,553 B1 | 1/2017 | Wilson et al. |
| 9,870,591 B2 | 1/2018 | Shah |
| 10,503,739 B2* | 12/2019 | Natkin .................... H04L 67/22 |
| 2014/0304833 A1 | 10/2014 | Gujar et al. |
| 2015/0095031 A1 | 4/2015 | Conkie et al. |
| 2016/0012817 A1 | 1/2016 | Plumpe et al. |
| 2017/0011029 A1 | 1/2017 | Chatterjee et al. |
| 2017/0076318 A1 | 3/2017 | Goswami et al. |
| 2018/0046938 A1 | 2/2018 | Allen et al. |
| 2020/0073895 A1* | 3/2020 | Vira ...................... G06F 16/906 |

OTHER PUBLICATIONS

Stack Overflow, "About—Stack Overflow" Stack Overflow, <https://stackoverflow.com/company> Retrieved Nov. 13, 2018, 1 Page.

IBM Corporation, "Improve—Watson Recommends", IBM Corporation, 2017, Retrieved Nov. 14, 2018, 1 Page.

* cited by examiner

TRAINING ARTIFICIAL INTELLIGENCE TO RESPOND TO USER UTTERANCES

BACKGROUND

The present invention relates to the field of artificial intelligence. Still more specifically, the present invention relates to the field of training and/or utilizing artificial intelligence based on user feedback to responses to user utterances.

SUMMARY

In an embodiment of the present invention, a method improves a functionality of a conversational agent that is generated by an artificial intelligence (AI) system. A conversational agent receives a first utterance from a first entity. The AI system identifies an unverified response to the first utterance; sends the unverified response to the first entity; and receives a positive feedback indication about the unverified response from the first entity. The AI system searches a data store in order to identify an entry for a second utterance by a second entity, where the first utterance and the second utterance are textually different from one another, where the unverified response has been sent to the second entity in response to the second utterance, and where the second entity has sent a positive feedback for the unverified response. The AI system sends the second utterance and the unverified response to the first entity, and receives a positive feedback for the unverified response to the second utterance from the first entity. In response to receiving the positive feedback for the unverified response to the second utterance from the first entity, the AI system marks the unverified response as a verified response. The AI system then receives the first utterance from a third entity, and responds to the first utterance from the third entity with the verified response.

In an embodiment of the present invention, the processor(s) activate, modify, and/or otherwise affect a hardware device based on the event that is identified by the AI system.

In one or more embodiments, the method(s) described herein are performed by an execution of a computer program product and/or a computer system.

DETAILED DESCRIPTION

Figure 1:
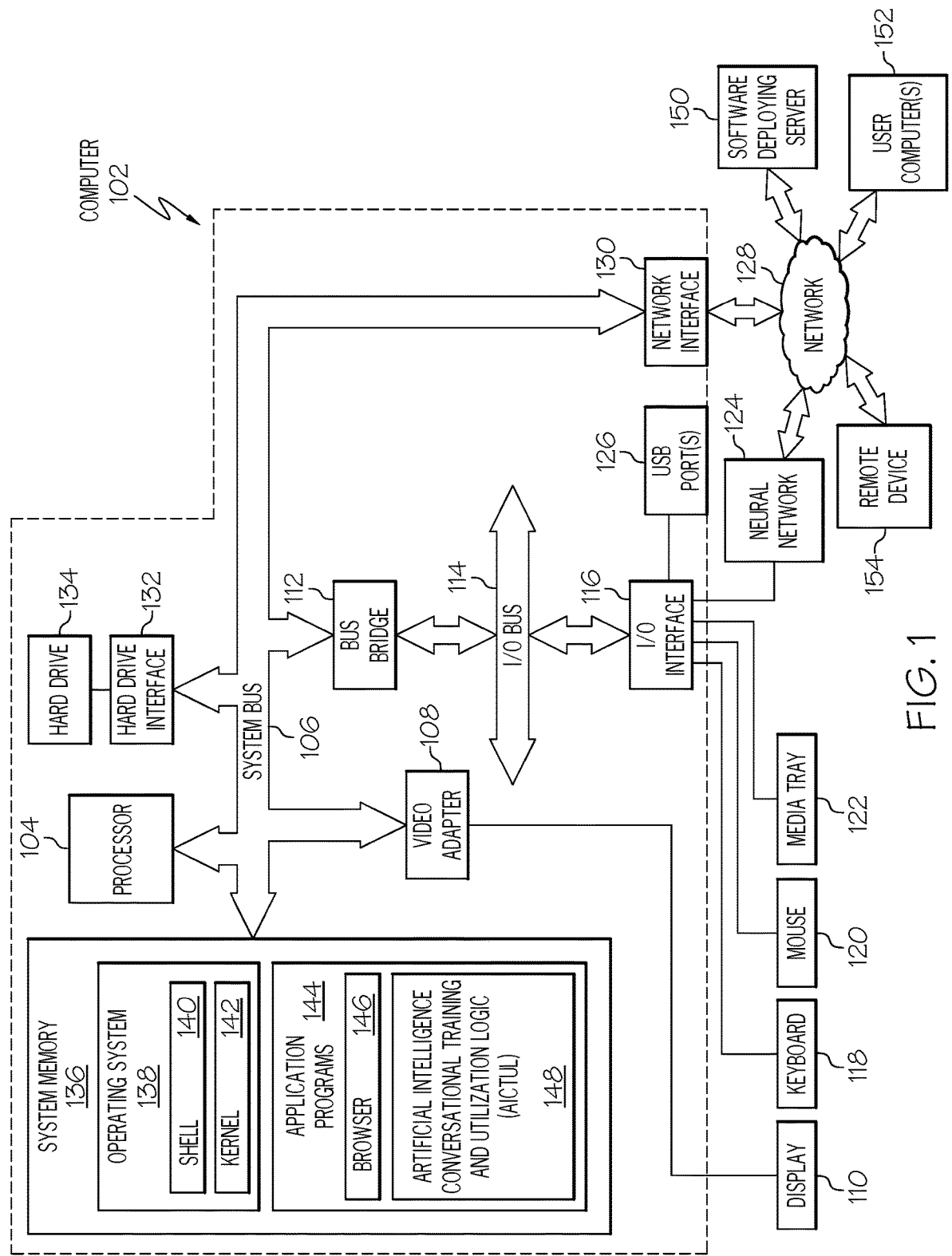
FIG. 1 depicts an exemplary system and network in which the present invention may be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function (s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or user computer(s) 152 and/or remote device 154 and/or neural network 124.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a neural network 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or the user computer(s) 152 and/or the remote device 154 and/or the neural network 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Artificial Intelligence Conversational Training and Utilization Logic (AICTUL) 148. AICTUL 148 includes code for implementing the processes described below, including those described in FIGS. 2-5. In one embodiment, computer 102 is able to download AICTUL 148 from software deploying server 150, including in an on-demand basis, wherein the code in AICTUL 148 is not downloaded until needed for execution. Note further that, in one embodiment of the present invention, software deploying server 150 performs all of the functions associated with the present invention (including execution of AICTUL 148), thus freeing computer 102 from having to use its own internal computing resources to execute AICTUL 148.

Also connected to (or alternatively, as part of) computer 102 is a neural network 124. In exemplary embodiments of the present invention, neural network 124 is a non-convolutional neural network (see FIG. 4), a convolutional neural network, or another type of heuristic artificial intelligence.

Also connected to computer 102 are user computer(s) 152, which are used by one or more users who are in an electronic communication session with an artificial intelligence (AI) based conversational agent, as described herein.

Also commented to computer 102 is a remote device 154. One or more examples of remote device 154 are presented in FIG. 3.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

An artificial intelligence (AI) conversation is a conversation between a person and a computer-generated responder. For example, a chat bot is an AI logic that engages in a text conversation with a person, such as a customer. Thus, if the customer texts a question to a service such as "What time is it in Paris?", the chat bot would respond with "It is currently 14:37 in Paris."

In order to answer this question, in one or more embodiments of the present invention the AI identifies what the question ("utterance") is asking by identifying key words/phrases and/or context in the question.

Context is derived explicitly from the utterance and/or answer, implicitly from the utterance and/or answer, and/or from another source.

For example, assume that the utterance is "How do I get to Store A today?" The term "today" gives a temporal context to the question of "How do I get to Store A?" by giving the time context ("today") of when the person needs to get to the location. Thus, the (temporal) context is derived explicitly from the term "today" in the utterance "How do I get to Store A today?"

Assume now that the utterance is "How do I get to Store A before it closes?". The term "before it closes" implicitly gives the context that the utterer is asking for a means (e.g., walking route, driving route, public transportation, etc.) for getting to the location of Store A before 5:00 pm, which is implicitly derived from the phrase "before it closes". That is, the system correlates the term "before it closes" with information known by a conversational agent (e.g., using a lookup table, a browser, etc.) that Store A closes at 5:00 pm. Using this implicit context, the conversational agent provides information that will enable the utterer to arrive at Store A before 5:00 pm. Thus, the (temporal) context is derived implicitly from the term "before it closes" in the utterance "How do I get to Store A before it closes?"

Assume now that the utterance is "How do I get there?". In this example, nothing in the utterance "How do I get there?" explicitly or implicitly give the context of what "there" is. In this example, the conversational agent receives information from another source to identify what "there" is (e.g., the location of Store A). In an embodiment of the present invention, the conversational agent detects that the utterer is using a chat portal from a website for Store A. As such, the conversational agent determines from this other information source that the utterer is looking for directions to Store A.

In accordance with one or more embodiments of the present invention, "intent" is defined as the purpose of the communication from the user, and preferably is identified by the system and then tagged with a hash tag (#). Examples of tagged intent include, but are not limited to, # location (asking for directions to a facility), # order_food (ordering food for delivery or take-out), # turn_on_device (directing the system to turn on a light, an appliance, etc.), etc.

In order to determine the intent of the communication, the system identifies one or more "entities" in the communication. In a preferred embodiment, an "entity" is a key word and/or phrase in the communication that leads the system to understanding what the intent of the communication is, and preferably are identified and tagged by the system with an "at" symbol (@). Examples of tagged entities include, but are not limited to, @city (which can lead to the identification of the intent # location), @pizza (which can lead to the identification of the intent # order_food), @dark (which can lead to the identification of the intent # turn_on_device), etc.

The communication being evaluated can be a question or a comment. Therefore, such a communication is referred to as an "utterance". For example, the utterance can be a question (e.g., "How do I get to your location?") that expressly describes the need of the utterer. Alternatively, the utterance can be a statement (e.g., "I wish my computer ran faster") that implicitly describes the need of the utterer for help in making his/her computer run faster.

Conversational solutions are solutions that improve the responses to utterances. That is, a conversational solution can modify AI responses to questions in order to improve the relevance of answers/responses to utterances. One approach used by conversational solutions is to ask the utterer to provide feedback about the answer(s) provided. For example, the answer/response can include a "Thumbs up" and "Thumbs down" image that, when clicked by the utterer, lets the chat bot know if the answer was useful/accurate/appropriate ("Thumbs up") or not ("Thumbs down").

In the prior art, conversational solutions are labor intensive when evaluating user feedback, since a subject matter expert (SME) must look at each feedback, particularly if the feedback is text written by the utterer. For example, assume that a customer (the "utterer") asks the chat bot "How do I change the font in a formula in my document?" Assume further that the chat bot sends an answer "Highlight the formula and then click the appropriate font icon in the tool bar". Assume then that the customer sends back the feedback "I want something faster". Such a response requires an SME to determine that the answer was not helpful, and thus, if enough negative comments/feedback such as this are received (e.g., 10% of the feedback responses), change the answer to the question/utterance "How do I change the font in a formula in my document?"

Prior art methods do not currently provide a way to reduce the amount of work required for a SME or other user of the tooling to look through user utterances or feedback to improve the system. For example, if 10,000 user utterances are processed and 1,000 of those received negative feedback, the process of determining the correct intent is still a lengthy and tedious task for a human expert. Being able to quickly iterate on this feedback, as provided by the present invention, leads to an improvement of the performance of the system by speeding up the feedback review process.

Furthermore, automation of such feedback analysis is not obvious since some negative feedback is based not on technical accuracy, but rather the utterer's own views. In the example above, the answer for changing the font is correct, but the user simply doesn't like it, since he/she feels that it is too slow/cumbersome. As such, eliminating correct answers ("Highlight the formula and then click the appropriate font icon in the tool bar") from the system is detrimental to performance, since accurate information is taken out of the system.

Furthermore, in the prior art all feedback, not just negative feedback, needs to be validated by an SME to ensure its correctness. That is, in the prior art all user feedback must be validated in some manner so as to reduce the amount of invalid feedback, which significantly hinders the ability to automate this process.

As such, one or more embodiments of the present invention provide a method for training an artificial intelligence (AI) system to validate a single user feedback before putting it into ground truth. In order to do this the AI system uses other users as a verification method. When a user sends feedback about an answer to a first question, the AI system looks for similar feedback about the answer for a different utterance. That is, after the user provides positive feedback stating that the answer is useful to the question posed by that user, the user is then asked to provide positive feedback that this same answer is also useful to another question posed by another user (who has already provided feedback that this answer is useful to this other question). As such, only when two (or more) users agree that the utterance-to-answer mapping is correct will the AI system incorporate it into ground truth (e.g., trust and/or validate the answer).

As such, one or more embodiments of the present invention provide the benefit of validating user feedback in-context to another highly related piece feedback. Prior art systems do not validate feedback in this optimal "in the moment" setting.

Figure 2:
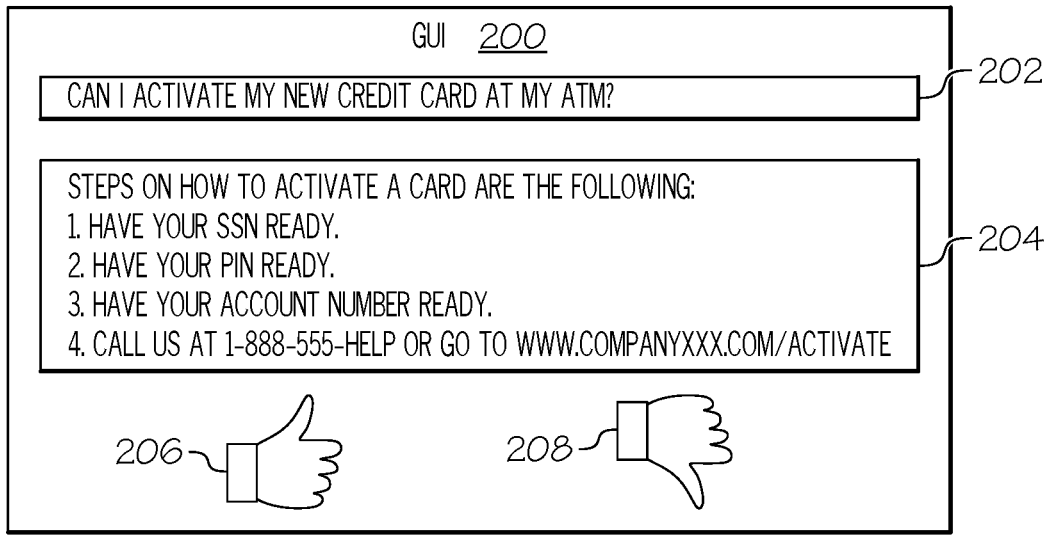
FIG. 2 illustrates graphical user interfaces used in one or more embodiments of the present invention.
Figure 2:
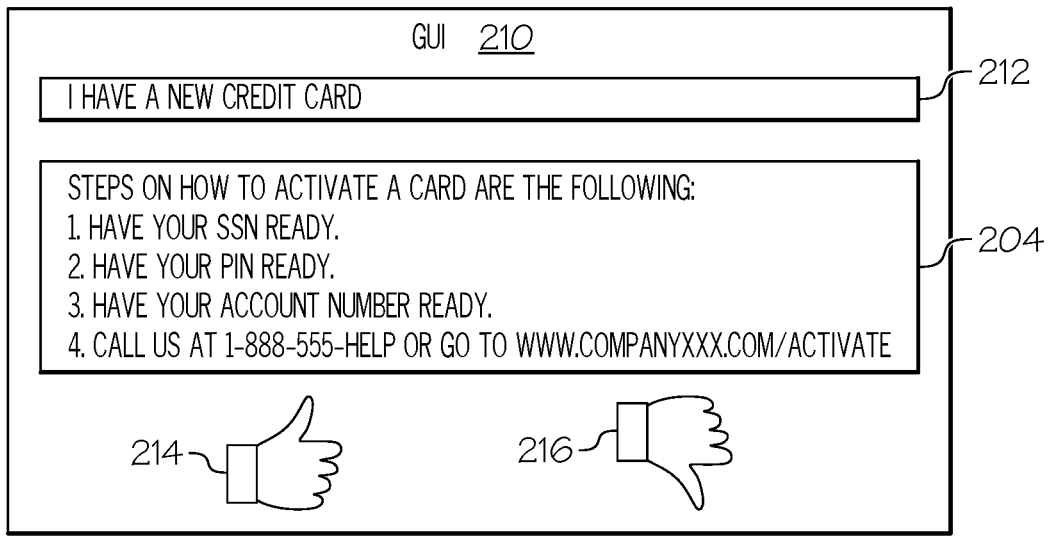

With reference now to FIG. 2, assume that a user of one of the user computer(s) 152 shown in FIG. 1 is communicating with computer 102 shown in FIG. 1 via display 110, which displays graphical user interface (GUI) 200 and GUI 210.

As shown in GUI 200, the user sends the utterance shown in box 202 of "Can I activate my new credit card at my ATM?" to computer 102, which responds (via a chat bot using artificial intelligence) with the answer shown in box 204. The user then provides feedback regarding whether or not the answer shown in box 204 was useful by clicking positive icon 206 (if the user found the answer helpful) or by clicking negative icon 208 (if the user found the answer to be not helpful).

In order to achieve these actions, the AI system (and more specifically, a communication agent associated with the AI system) extracts the intent I1 (e.g., asking for help in activating a credit card) and entities E1 (e.g., "activate", "credit card", "ATM") from the utterance U1 shown in box 202 in order to generate and return the answer A1 shown in box 204. The user then clicks either positive icon 206 or negative icon 208 to provide feedback about answer A1.

If the feedback is positive (e.g., the user has clicked positive icon 206, which results in a positive message being sent to computer 102 indicating that the user found the answer A1 useful in answering the utterance U1), then that user has now 1) validated the dialog response that is answer A1, and 2) implicitly validated the intent/entities I1/E1 extracted by the system for utterance U1. However, at this time, the feedback is not deemed to be "golden". That is, at this point the positive feedback provided by the user may or may not be accurate, since it is just that single user's opinion, which might not be valid. Thus, the system does not promote this feedback as "golden", but rather holds it in a feedback database for future verification as a "singly-verified" feedback entry that includes the utterance U1, the intent I1 from utterance U1, entities E1 from the utterance, answer A1, and the verifier (i.e., a "positive" feedback) for the utterance U1.

Thereafter, the user is asked to verify other utterances (e.g., U2, U3, etc.) from the feedback database with matching intent/entities (I1/E1) and answer (A1). That is, the user is given answer A1 and asked if it answers utterance U2. For example, as shown in GUI 210, which is also displayed to the same user (a "first entity") that responded using GUI 200, a new utterance U2 ("I have a new credit card") is displayed in a new box 212.

Assume now that a second entity has previously provided this new utterance U2 ("I have a new credit card") to the conversational agent, which responded with answer A1. Assume further that the second entity stored this pairing U2:A1 in the feedback database, indicating that answer A1 is a valid answer for utterance U2. This U2:A1 pairing and storing is without further validation from another entity in one embodiment, while in yet another embodiment of the present invention the U2:A1 storage in the feedback database occurs only after a third entity has validated that answer A1 is a valid answer to utterance U2.

Since the pairing of utterance U2 and answer A1 is found in the feedback database, then the AI system knows that the "second entity" has previously affirmed that answer A1 is a useful/correct answer for utterance U2. The first entity who originally affirmed that answer A1 is a useful/correct answer for utterance U1 is then asked whether the answer A1 shown in box 204 (which is the same answer A1 shown in the box 204 in GUI 200) is also a useful answer to the new utterance U2 shown in box 212. As shown in FIG. 2, the utterance U1 (from box 202) and the utterance U2 (from box 212) have different text, but have a same intent of learning how to activate a new credit card (asked explicitly in utterance U1 and implicitly in utterance U2) meaning they share at least one intent ("new credit card").

If the first entity validates (approves of) answer A1 as being a proper answer for utterance U2 (by clicking the positive icon 214 instead of the negative icon 216), then the system determines that answer A1 is confirmed to be a valid answer for utterance U1. That is, since the first entity stated that answer A1 is a valid/useful answer to both utterance U1 and utterance U2, then the first entity's validation of utterance U1 is now trusted, since the first entity agreed with the second entity regarding the usefulness of answer A1 for utterance U2.

Thus, in an embodiment of the present invention, the validation of answer A1 for utterance U1 is dependent upon the utterer of utterance U1 agreeing with the utterer of utterance U2 that utterance U2 is properly answered by answer A1. In a further embodiment of the present invention, the context of utterance U1 and utterance U2 are also required to match. That is, not only does the answer A1 need to be appropriate for utterance U1 and utterance U2, and that the utterer of utterance U1 and the utterer of utterance U2 both agree that answer A1 is a valid answer for both utterance U1 and utterance U2, but the context of utterance U1 and the context of utterance U2 must also agree. For example, if the context of utterance U1 is "today" when asking "Can I activate my new credit card at my ATM?", then the context of utterance U2 must also be "today" when uttering "I have a new credit card" before the utterer of utterance U1 is presented with utterance U2. That is, in this further embodiment only utterances U2 that have a same context (e.g., for a particular time, a particular product, a particular type of uttering entity, etc.) are used to cross-validate the answer for the first utterance U1.

While this example describes the first entity agreeing with the second entity in order to establish the credibility of the first entity (i.e., two users agreeing), in one or more embodiments the number of users agreeing on the validity of a given answer for a given question is greater than 2.

If the first entity (who originally validated answer A1 for utterance U1) rejects answer A1 for utterance U2 (by clicking the negative icon 216), then various actions take place in various embodiments of the present invention.

In an embodiment of the present invention, if the first entity and the second entity disagree about the usefulness of answer A1 for utterance U2, then the first entity's opinion about answer A1 with regard to utterance U1 is disregarded (i.e., the "approval" vote from the first entity regarding A1:U1 is deleted from the system).

In an embodiment of the present invention, if the first entity and the second entity disagree about the usefulness of answer A1 for utterance U2, but other users (e.g., more than some predefined quantity) approve of answer A1 for utterance U1, then answer A1 is deemed useful for utterance U1, regardless of the fact that the first and second entity disagree about the usefulness of answer A1 for utterance U2.

In an embodiment of the present invention, "reputational voting" gives different weights to user votes based on the quality of their feedback or some other profile/reputational score. For example, assume that the first entity has no expertise in the topic addressed in utterance U1. As such, this first entity is assigned a low weighting (e.g., 0.1). Assume now that a third entity has a high level of expertise in the topic addressed in utterance U1. As such, this third entity is assigned a high weighting (e.g., 0.9). Thus, the opinion of the third entity is so much greater than the opinion of the first entity that, even if several other users (with similar credentials as the first entity) who are evaluating utterance U1 disagree with the second entity regarding utterance U2, the opinion of the third entity is so valued that it "overrides" the opinions of the first and other users.

In an embodiment of the present invention, the AI system does not simply give instructions on how to interact with a device, but rather directly controls the device. For example, consider box 204 shown in FIG. 2. Assume that rather than giving the first entity directions on how to activate the new credit card, box 204 includes a message that an ATM (e.g., that the first entity is standing in front of) has now had a slot opened to receive the new credit card for activation. As such, the system directly controls the ATM device simply based on the utterance U1 shown in box 202.

As such, one or more embodiments of the present invention directly control a physical device.

Figure 3:
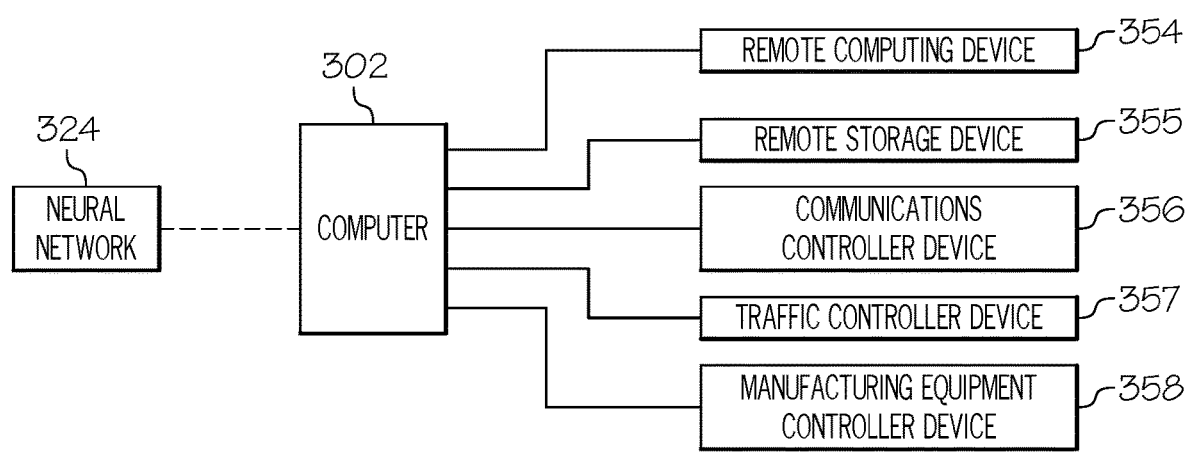
FIG. 3 depicts a connective relationship between a controlling computer and one or more devices used in one or more embodiments of the present invention.

With reference now to FIG. 3, several embodiments of the present invention are represented in which a computer 302 (analogous to computer 102 shown in FIG. 1) directly controls various devices in accordance with the verified response to the first utterance U1.

FIG. 3 depicts a remote computing device 354, a remote storage device 355, a communications controller device 356, a traffic controller device 357, and a manufacturing equipment controller device 358, all of which are exemplary embodiments of the remote device 154 shown in FIG. 1.

With regard to remote computing device 354, assume that an utterance (question, statement, etc.) from a user indicates that the user needs his/her computer to be upgraded (e.g., have a security patch installed, open up a new network port, add new cloud-based virtual machine (VM) processors, etc.). As such, once the AI system determines that such an action is appropriate (based on the user validating both utterance U1 and utterance U2 as being properly addressed by the verified response that is answer A1), then computer 302 will automatically upgrade the user's computer accordingly.

With regard to remote storage device 355, assume that an utterance (question, statement, etc.) from a user indicates that the user needs additional data storage (e.g., turning on additional memory devices on the user's network, configuring new virtual storage devices on a cloud, etc.). As such, once the AI system determines that such an action is appropriate (based on the user validating both utterance U1 and utterance U2 as being properly addressed by the verified response that is answer A1), then computer 302 will automatically upgrade the user's storage capability accordingly.

With regard to communications controller device 356, assume that an utterance (question, statement, etc.) from a user indicates that the user needs cellular coverage in an area in which cellular coverage is usually limited (e.g., for security reasons). As such, once the AI system determines that such an action is appropriate (based on the user validating both utterance U1 and utterance U2 as being properly addressed by the verified response that is answer A1), then computer 302 will automatically turn on the appropriate cell tower for the user.

With regard to traffic controller device 357, assume that an utterance (question, statement, etc.) from a user indicates that the user is a first responder's emergency vehicle that needs traffic lights along its route to be turned green (in order to arrive at the scene in need of emergency assistance quickly). As such, once the AI system determines that such an action is appropriate (based on the user validating both utterance U1 and utterance U2 as being properly addressed by the verified response that is answer A1), then computer 302 will automatically clear the route of the emergency vehicle by controlling the traffic lights along that route.

With regard to manufacturing equipment controller device 358, assume that an utterance (question, statement, etc.) from a user indicates that the user needs for a certain unit of manufacturing equipment (e.g., a pump in a refinery, a roller in a factory, etc.) to be turned on. As such, once the AI system determines that such an action is appropriate (based on the user validating both utterance U1 and utterance U2 as being properly addressed by the verified response that is answer A1), then computer 302 will automatically activate and/or modify the appropriate equipment accordingly.

As indicated by the dashed line to neural network 324 (analogous to neural network 124 shown in FIG. 1), in one or more embodiments the actions of computer 302 are under the direction of neural network 324. For example, assume that a verified response (associated with the output of neuron 404 shown in FIG. 4) is to activate, modify, etc. one of the devices shown in FIG. 3. As such, the computer 302 takes this information from the neural network 324.

Thus, in one or more embodiments, the present invention uses an electronic neural network, such as the neural network 124 shown in FIG. 1, to respond to user utterances and to receive feedback to responses to the user utterances. In various embodiments of the present invention, the neural network 124 shown in FIG. 1 is a Non-Convolutional Neural Network, a Convolutional Neural Network (CNN), and/or another type of machine learning system. In a preferred embodiment, a NN is used to evaluate text/numeric data in a user utterance, while a CNN is used to evaluate an image provided by a user in a comment, question, etc. that is the user's utterance.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a NN, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

Figure 4:
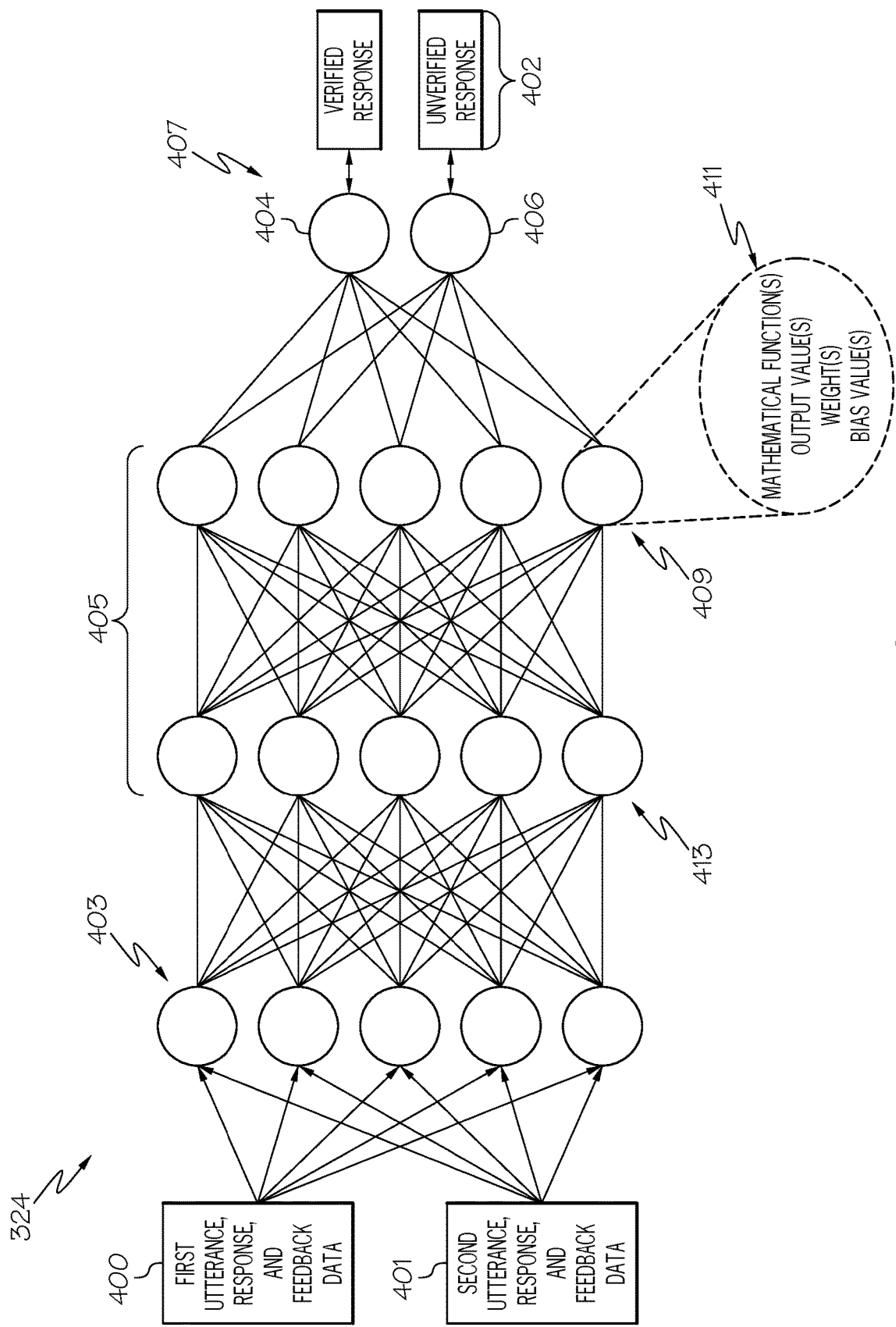
FIG. 4 depicts an exemplary neural network as used in one or more embodiments of the present invention.

With reference now to FIG. 4, a Neural Network (NN) 324 used to evaluate textual data in one or more embodiments of the present invention is presented. For example, assume, for illustrative purposes, that first utterance, response, and feedback data shown in box 400 400 are text and/or data that describes the first utterance U1, the response that is answer A1, and the user's feedback for U1:A1 as described above (see FIG. 2). Assume further, for illustrative purposes, that the second utterance, response, and feedback data shown in box 401 are text and/or data that describes the second utterance U2, and the response that is answer A1, and the user's feedback for U2:A1 as described in FIG. 2.

The electronic neurons in NN 324 are arranged in layers, known as an input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often a single node for holding vector information. In an embodiment of the present invention, each neuron in the output layer 407 is associated with a particular response label from response labels 402, as shown in FIG. 4.

As just mentioned, each node in the depicted NN 324 represents an electronic neuron, such as the depicted neuron 409. As shown in block 411, each neuron (including neuron 409) includes at least four features: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the NN 324 to be further "fine tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the NN 324, such that a reliable output will result from output layer 407. Such adjustments are alternatively performed manually or automatically.

When manually adjusted, the weights and/or biases are adjusted by the user in a repeated manner until the output from output layer 407 matches expectations. For example, assume that input layer 403 receives inputs from box 400 that describes how the user approved of answer A1 for utterance U1. Assume further that input layer 403 receives inputs from box 401 that describes the same user approving of answer A1 for utterance U2. If NN 324 has been properly trained (by manually adjusting the mathematical function(s), output value(s), weight(s), and biases in one or more of the electronic neurons within NN 324) to output a correct output vector (e.g., a 2-tuple output vector of 0.9, 0.2) to the output layer 407, then the neuron 404 for the verified response has the highest value (0.9). Furthermore, the NN 324, when properly trained, gives a value of 0.2 to neuron 406, indicating that the user's approval of answer A1 for utterance U1 is not valid, since the user did not agree with another user that answer A1 is valid for utterance U2.

Thus, a properly trained NN 324 will output a value from neuron 404 that is higher than the value from other neurons in the output layer 407 based on the interactions between the neurons in input layer 403 and hidden layers 405 and output layer 407 and the data that is input into the input layer 403. That is, the neurons in NN 324 are manually adjusted such that when the user validates answer A1 for both utterance U1 and utterance U2, then neuron 404 has the highest output value (indicating that the user's feedback about A1:U1 is valid), but neuron 406 has the highest output value when the input data suggests that the user's feedback about A1:U1 is invalid.

When automatically adjusted, the weights (and/or mathematical functions) are adjusted using "back propagation", in which weight values of the neurons are adjusted by using a "gradient descent" method that determines which direction each weight value should be adjusted to. For example, if the output from neuron 404 is just 0.5 and the output from neuron 406 is also 0.5, but the output from the neuron 404 (which is associated with Event A, such as a trade meeting) should be higher than any other neuron from the output layer 407, then the output from neuron 404 is manually changed to a high value (e.g., 0.9) and the output of neuron 406 is changed to 0.2 or smaller. The back-propagation gradient descent process moves the weight and/or bias in each neuron in a certain direction until the output from output layer 407 improves (e.g., gets closer to outputting a highest value to neuron 404 or a highest value to neuron 406, depending on whether the user's opinion of the answer A1 for utterance U1 is valid or not).

In an embodiment of the present invention, the adjustment of the NN automatically incorporates "goldenized" feedback into the chat system by retraining the underlying algorithm/system/NN that does intent classification and other activities associated with the chat system. For example, assume that once the NN determines that a particular answer A1 is a verified response (see node 404 in FIG. 4), then this verified response is incorporated into the chat system, such that the chat system (chat bot) uses answer A1 when responding to utterance U1 as described above.

A CNN is similar to a NN in that both utilize interconnected electronic neurons. However, a CNN is different from a NN in that 1) a CNN has neural layers whose sizes are based on filter sizes, stride values, padding values, etc., and 2) a CNN utilizes a convolution scheme to analyze image data. A CNN gets its "convolutional" name based on a convolution (i.e., a mathematical operation on two functions to obtain a result) of filtering and pooling pixel data (a mathematical operation on two functions) in order to generate a predicted output (obtain a result).

Figure 5:
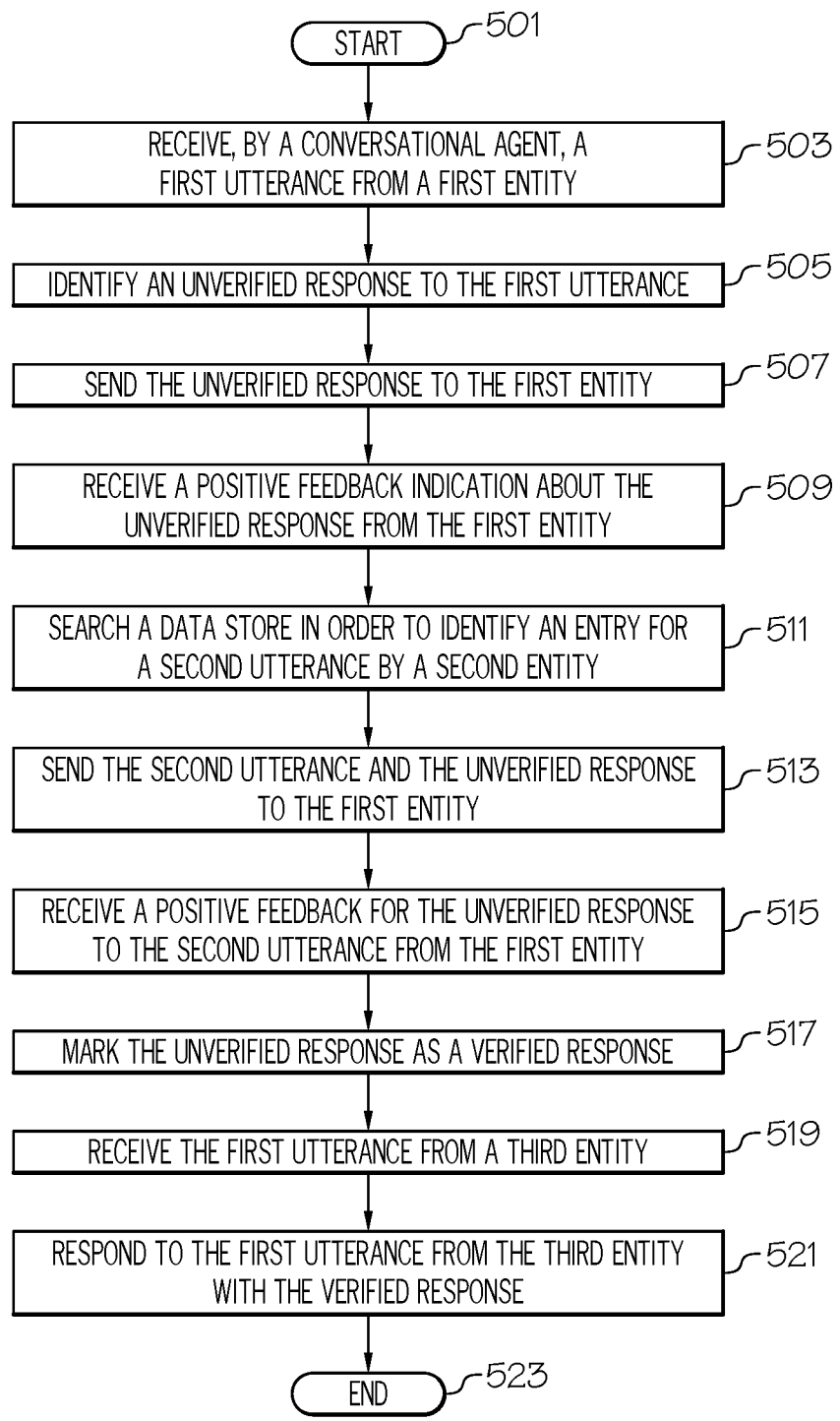
FIG. 5 is a high-level flow chart of one or more steps performed in accordance with one or more embodiments of the present invention.

With reference now to FIG. 5, a high-level flow chart of one or more embodiments of the present invention is presented.

After initiator block 501, a conversational agent (e.g., a text bot, an AI system, etc.) receives an utterance from a first entity (e.g., a user, an organization, a computer system, etc.), as depicted in block 503. In one or more embodiments of the present invention, the conversational agent is generated by an artificial intelligence system. For example, the NN 324 shown in FIG. 4 not only determines whether a response (e.g., a feedback) from the first entity is verified or unverified as described above, but the NN 324 also is trained to act as the conversational agent (e.g., text bot) by taking in utterances into input layer 403, and to output an answer/response in output layer 407. For example, if an utterance "Can I activate my new credit card at my ATM?" is input into input layer 403, then the information shown as answer A1 in box 204 in FIG. 2 is output as a string of text in the output layer 407 once the NN 324 is properly trained (as described above). That is, the intent/entities from the utterance cause the neurons in the NN 324 to produce an output that is the answer A1.

As described in block 505, one or more processors (e.g., processor 104 shown in FIG. 1) identify an unverified response to the utterance by the conversational agent. That is, at this point the answer (response) is unverified, since it might or might not be a useful answer/response to the utterance (e.g., question).

As described in block 507, the processor(s) then send the unverified response (e.g., answer A1) to the first entity.

As described in block 509, the processor(s) send a request for feedback about the unverified response to the first entity. For example, a request is sent to the first entity in the form of a text question about whether answer A1 is useful to addressing the intent of the utterance U1, or in the form of a "thumbs up" or "thumbs down" icon, etc.

As described in block 511, the processor(s) receive a positive feedback indication about the unverified response from the first entity. For example, the user clicks the "thumbs up" icon, indicating that he/she thinks that answer A1 is a good response to utterance U1.

As described in block 513, the processor(s) search a data store in order to identify at least one other entry meeting a similarity criteria to the utterance, where the similarity criteria is less than an exact match between the utterance and the at least one other entry. That is, the data store includes other utterance:response (e.g., "question:answer") pairs other than the utterance:response pair of U1:A1. As described herein, the text in utterance U1 is different from the text in utterance U2, even though they are related closely enough that they are both properly answered by answer A1.

As described in block 515, responsive to identifying at least one other entry in the data store meeting the similarity criteria for the utterance, the processor(s) send the at least one other entry and a request to provide feedback about the at least one other entry to the first entity. That is, the processor(s) find an utterance U2 that 1) is closely related by its intent and/or its entity to utterance U1, and 2) has been answered by the same answer A1 that has been presented by the system for utterance U1.

As described in block 517, responsive to receiving a positive feedback for the at least one other entry from the first entity, the processor(s) mark the unverified response as a verified response to the utterance. That is, the response (e.g., answer A1) is not verified as being an appropriate response to utterance U1 since the first entity has not been verified by providing the same feedback for answer A1 responsive to utterance U2. The system now has answer A1 (the response) that is deemed to be properly vetted, approved, etc., and will be used to respond to future instances of utterance U1.

Thus, and as described in block 519, the processor(s) subsequently receive the utterance U1 from a third entity (i.e., another user, customer, enterprise, etc.). Since answer A1 has now been verified as being a valid/useful answer to utterance U1, the processors respond to the utterance from the third entity with the verified response (answer A1), as described in block 521.

The flow-chart ends at terminator block 523.

In an embodiment of the present invention, responsive to receiving the positive feedback indication about the unverified response from the first entity, the processor(s) store a representation of the utterance in the data store. This representation comprises the utterance (e.g., for utterance U1), the unverified response (e.g., answer A1), one or more entities (E1) from the utterance, one or more intents (I1)

derived from the utterance, and an indication (approval or disapproval) of a single verification of the unverified response by the first entity, as described herein.

In an embodiment of the present invention, the artificial intelligence system is a neural network, and the method further comprises training the neural network to verify the unverified response in order to create the verified response based on identifying the at least one other entry in the data store that meets the similarity criteria for the utterance (see FIG. 4).

In an embodiment of the present invention, the verified response activates a physical device (see FIG. 3). For example, the verified response not only confirms that the answer to the utterance is valid, but also causes a device (e.g., a pump, a computer, etc.) to turn on.

In an embodiment of the present invention, the verified response modifies a physical device. For example, the verified response not only confirms that the answer to the utterance is valid, but also causes a device (e.g., a computer, a storage device, etc.) to be modified (e.g., by adding virtual processors, cloud-based storage devices, etc.).

In an embodiment of the present invention, the verified response improves a functionality of a physical device. For example, the verified response not only confirms that the answer to the utterance is valid, but also causes a device (e.g., a computer, a storage device, etc.) to be modified (e.g., by adding virtual processors, cloud-based storage devices, etc.) in order to make the device run more efficiently, have greater processing power, etc.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
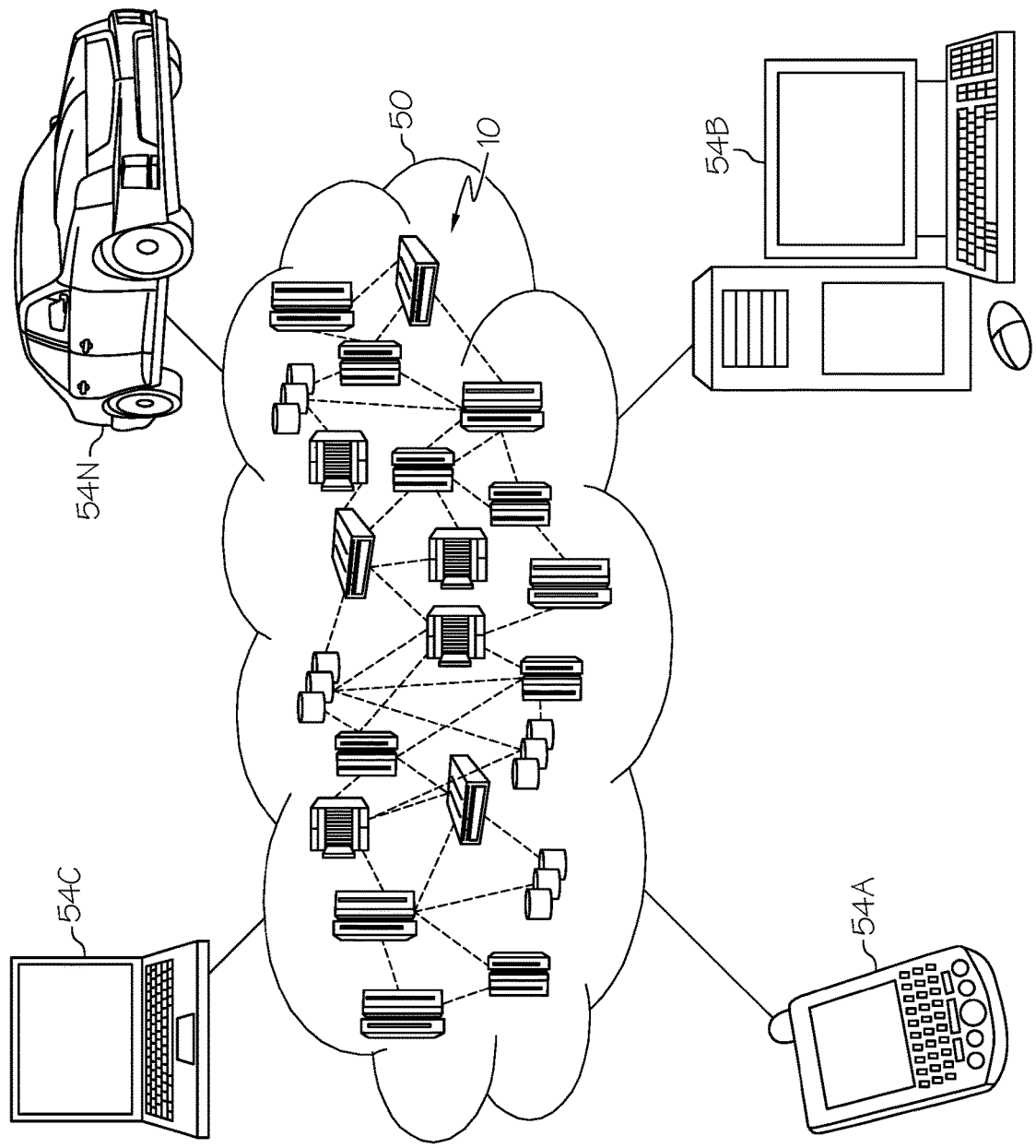
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
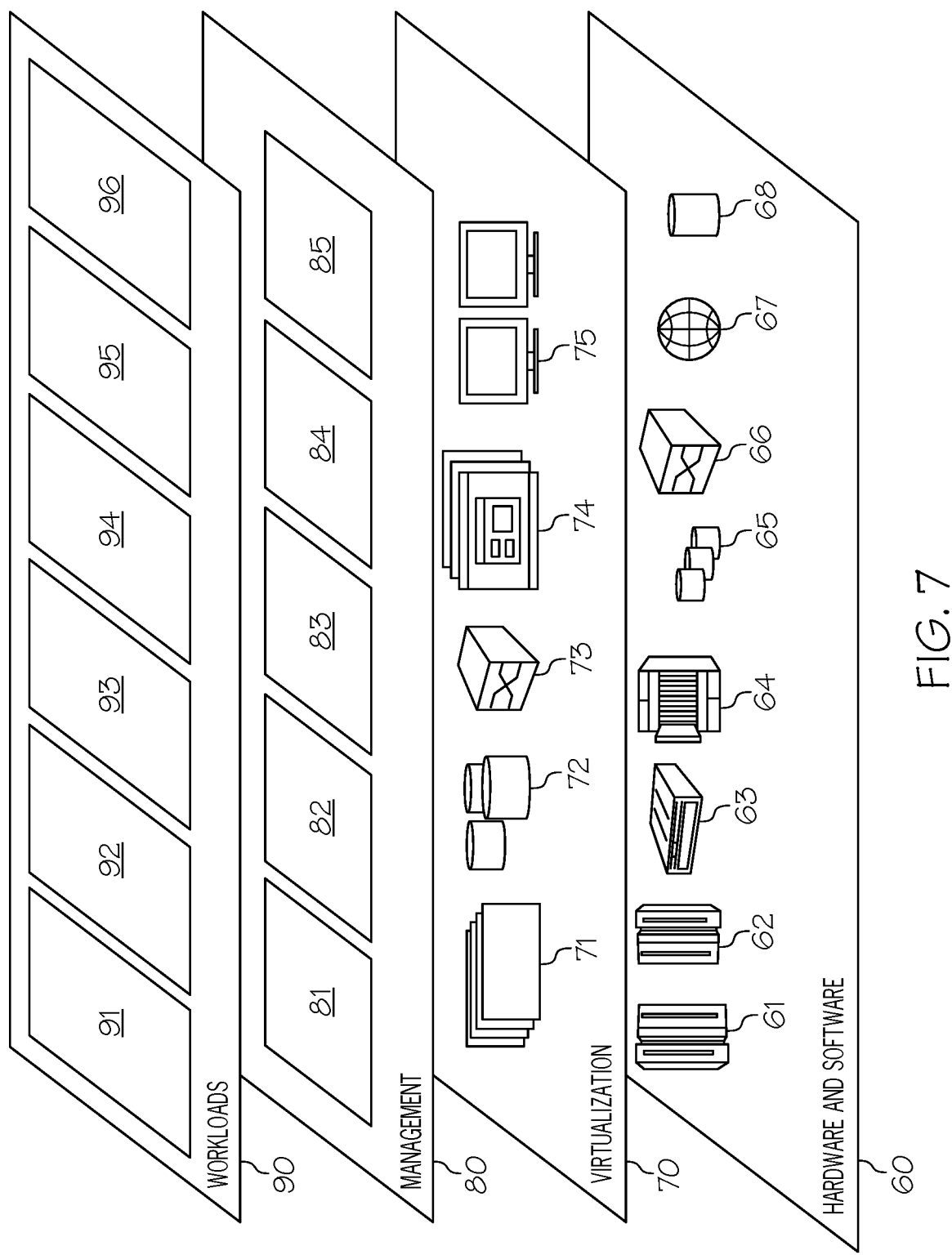
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and neural network training processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by a conversational agent, a first utterance from a first entity, wherein the conversational agent is generated by an artificial intelligence system;
   identifying, by one or more processors, an unverified response to the first utterance;
   sending, by the one or more processors, the unverified response to the first entity;
   receiving, by the one or more processors, a positive feedback indication about the unverified response from the first entity;
   searching, by the one or more processors, a data store in order to identify an entry for a second utterance by a second entity, wherein the first utterance and the second utterance are textually different from one another, wherein the unverified response has been sent to the second entity in response to the second utterance, and wherein the second entity has sent a positive feedback for the unverified response;

sending, by the one or more processors, the second utterance and the unverified response to the first entity;

receiving, by the one or more processors, a positive feedback for the unverified response to the second utterance from the first entity;

in response to receiving the positive feedback for the unverified response to the second utterance from the first entity, marking, by the one or more processors, the unverified response as a verified response;

receiving, by the one or more processors, the first utterance from a third entity; and responding, by the one or more processors, to the first utterance from the third entity with the verified response.

2. The method of claim 1, further comprising:

responsive to receiving the positive feedback for the unverified response to the second utterance from the first entity, storing, by the one or more processors, a representation of the first utterance in a data store, wherein the representation comprises the first utterance, the unverified response, one or more entities from the first utterance, one or more intents derived from the first utterance, and an indication of a single verification of the unverified response by the first entity.

3. The method of claim 1, wherein the artificial intelligence system is a neural network, and wherein the method further comprises:

training the neural network to verify the unverified response in order to create the verified response based on the first entity providing feedback that the verified response properly answers both the first utterance and the second utterance.

4. The method of claim 1, wherein the verified response activates a physical device.

5. The method of claim 1, wherein the verified response modifies a physical device.

6. The method of claim 1, wherein the verified response improves a functionality of a physical device.

7. A computer program product comprising a computer readable storage medium having program code embodied therewith, wherein the computer readable storage medium is not a transitory signal per se, and wherein the program code is readable and executable by a processor to perform a method comprising:

receiving, by a conversational agent, a first utterance from a first entity, wherein the conversational agent is generated by an artificial intelligence system;

identifying an unverified response to the first utterance;

sending the unverified response to the first entity;

receiving a positive feedback indication about the unverified response from the first entity;

searching a data store in order to identify an entry for a second utterance by a second entity, wherein the first utterance and the second utterance are textually different from one another, wherein the unverified response has been sent to the second entity in response to the second utterance, and wherein the second entity has sent a positive feedback for the unverified response;

sending the second utterance and the unverified response to the first entity;

receiving a positive feedback for the unverified response to the second utterance from the first entity;

in response to receiving the positive feedback for the unverified response to the second utterance from the first entity, marking the unverified response as a verified response;

receiving the first utterance from a third entity; and responding to the first utterance from the third entity with the verified response.

8. The computer program product of claim 7, wherein the method further comprises:

responsive to receiving the positive feedback for the unverified response to the second utterance from the first entity, storing a representation of the first utterance in a data store, wherein the representation comprises the first utterance, the unverified response, one or more entities from the first utterance, one or more intents derived from the first utterance, and an indication of a single verification of the unverified response by the first entity.

9. The computer program product of claim 7, wherein the artificial intelligence system is a neural network, and wherein the method further comprises:

training the neural network to verify the unverified response in order to create the verified response based on the first entity providing feedback that the verified response properly answers both the first utterance and the second utterance.

10. The computer program product of claim 7, wherein the verified response activates a physical device.

11. The computer program product of claim 7, wherein the verified response modifies a physical device.

12. The computer program product of claim 7, wherein the verified response improves a functionality of a physical device.

13. The computer program product of claim 7, wherein the program code is provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

receiving, by a conversational agent, a first utterance from a first entity, wherein the conversational agent is generated by an artificial intelligence system;

identifying an unverified response to the first utterance;

sending the unverified response to the first entity;

receiving a positive feedback indication about the unverified response from the first entity;

searching a data store in order to identify an entry for a second utterance by a second entity, wherein the first utterance and the second utterance are textually different from one another, wherein the unverified response has been sent to the second entity in response to the second utterance, and wherein the second entity has sent a positive feedback for the unverified response;

sending the second utterance and the unverified response to the first entity;

receiving a positive feedback for the unverified response to the second utterance from the first entity;

in response to receiving the positive feedback for the unverified response to the second utterance from the first entity, marking the unverified response as a verified response;

receiving the first utterance from a third entity; and
responding to the first utterance from the third entity with the verified response.

15. The computer system of claim 14, wherein the method further comprises:
responsive to receiving the positive feedback for the unverified response to the second utterance from the first entity, storing a representation of the first utterance in a data store, wherein the representation comprises the first utterance, the unverified response, one or more entities from the first utterance, one or more intents derived from the first utterance, and an indication of a single verification of the unverified response by the first entity.

16. The computer system of claim 14, wherein the artificial intelligence system is a neural network, and wherein the method further comprises:
training the neural network to verify the unverified response in order to create the verified response based on the first entity providing feedback that the verified response properly answers both the first utterance and the second utterance.

17. The computer system of claim 14, wherein the verified response activates a physical device.

18. The computer system of claim 14, wherein the verified response modifies a physical device.

19. The computer system of claim 14, wherein the verified response improves a functionality of a physical device.

20. The computer system of claim 14, wherein the stored program instructions are provided as a service in a cloud environment.

* * * * *